Sept. 16, 1930.  E. W. ACKERMAN ET AL  1,775,840
HYDRAULIC RESISTANCE DEVICE
Filed Nov. 23, 1928
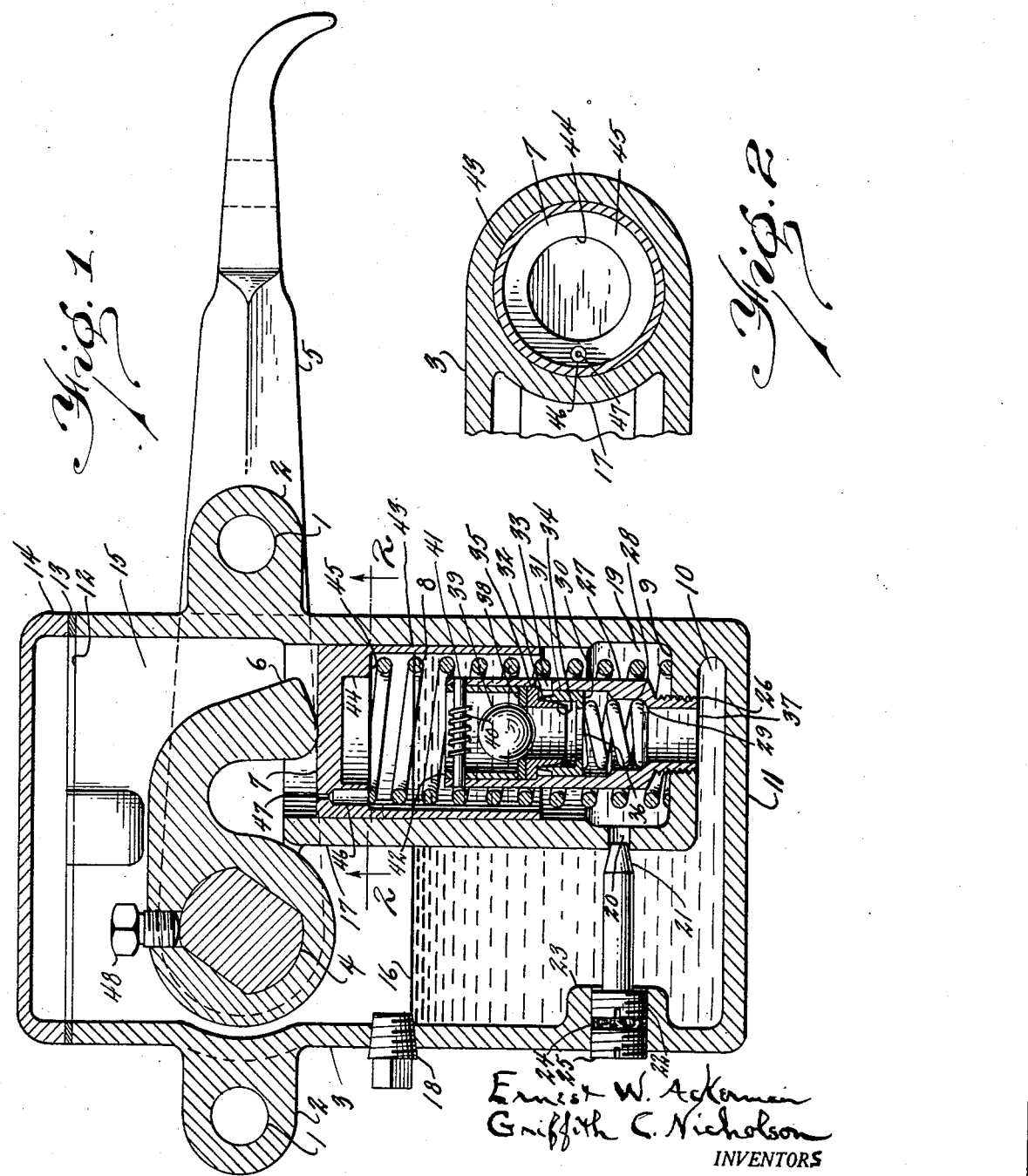
Ernest W. Ackerman
Griffith C. Nicholson
INVENTORS
BY Geo. E. Kirk
ATTORNEY.

Patented Sept. 16, 1930

1,775,840

UNITED STATES PATENT OFFICE

ERNEST W. ACKERMAN AND GRIFFITH C. NICHOLSON, OF MONROE, MICHIGAN, ASSIGNORS TO HYDRO-CHECK CORPORATION, OF MONROE, MICHIGAN, A CORPORATION OF MICHIGAN

HYDRAULIC RESISTANCE DEVICE

Application filed November 23, 1928. Serial No. 321,303.

This invention relates to resistance devices for retarding travel between two relatively movable connected members.

This invention has utility when incorporated in auxiliary connections between the axle and chassis of motor vehicles for rebound take up.

Referring to the drawings:

Fig. 1 is a view in vertical section through the casing, of an embodiment of the device in a hydraulic pneumatic type of rebound resistance for motor vehicle application; and Fig. 2 is a section on the line 2—2, Fig. 1, looking in the direction of the arrow.

Through openings 1 in ears 2 bolts may connect casing 3 for fixed mounting with the chassis of a motor vehicle as shown in Patent 1,610,644, Dec. 14, 1926. Through a lateral opening in this casing 3, there extends rock shaft 4 with which is fixedly mounted arm 5 for connection to the axle of the vehicle, thereby, in the relative shifting of the chassis to the axle, to effect movement of cam arm 6 as acting on piston head 7 against the thrust of helical compression spring 8, seated on cylinder head 9 integral with the casing 3, and having clearance 10 as to imperforate bottom 11 of this casing 3. Remote from this closed bottom 11, the casing 3 has open top 12 with seat for gasket 13 against which is fixedly anchored closure or top 14 in providing closed upper air chamber 15 for such compressible medium.

The lower portion of this casing 3 contains liquid 16 as the incompressible medium coacting in the operation of this device hereunder. This incompressible medium is desirably maintained at a level below the top of cylinder 17 as an integral wall rising from the cylinder head 9. This level for the liquid as castor oil, alcohol, glycerin, cylinder stock, or combination thereof, may be determined by filling the casing 3 up to the orifice as closed by filling plug 18.

The cylinder 17 near its lower portion has enlarged diameter region 19 in which there is located lateral port 20. This port 20 has its capacity reduced by tapered stem 21 so that this port may act as a seepage opening. This stem 21 has threaded enlargement 22 mounted in internal boss 23 of the casing 3, so that this stem may be longitudinally adjusted to vary the effective seepage capacity through the port 20. As such adjustment is determined, packing 24 may be disposed in this boss 23 and plug 25 as a concealing means assembled thereover.

The cylinder head 9 is shown as having port 26 with which is thread assembled tower valve tubular housing 27, housing secondary helical spring 28 coacting between shoulder 29 of the tubular housing and shoulder 30 of relief valve sleeve 31 having reduced diameter portion 32 in the region of port 33 as communicating with the interior of the cylinder 17. This reduced diameter portion 32 provides a pressure region effective as pressure builds up in the cylinder 17 to force this relief valve sleeve 31 against the action of the spring 28 thus allowing, in addition to the escape by the seepage port 20, flow through the port 33 past depending sleeve portion 34 of seat member 35. This relief flow is thence through opening 36 centrally of the shoulder 30 and through opening 37 into the clearance 10.

This seat member 35 has thereover seat 38 for ball check valve 39 normally closed as pressure is built up in the cylinder 17. However, as there is action of the arm 5 causing the cam 6 to move away from piston head 7, the spring 8 tends to thrust this piston out of the cylinder, thereby reducing the pressure in the cylinder and lifting the ball 39 for free inflow of the incompressible medium 16 into the cylinder 17. The quick action in this operation tends to throw the ball 39 upwardly and in such movement it strikes spring 40 on pin 41 as anchoring sleeve 42. This pull thus holds the seat 38 assembled in the tower valve unitary structure and holds the ball 39 from snapping outward as well as quiets any hammering action of this ball in its upward throw or jump.

The piston as provided with the head 7 has downwardly depending primary or major skirt portion 43 and secondary or minor skirt portion 44 of less diameter, concentric of the piston, and in closer proximity to the piston head 7 than the major skirt portion 43. This major skirt portion 43 houses the helical spring 8 to an extent and serves to guide the piston in the major region of the cylinder 17. This minor skirt portion 44 is separated from the major skirt portion 43 by shoulder 45 providing a seat for this compression helical spring 8.

In the carrying out of the invention herein to permit this device to have compressible fluid medium range before the greater resistance of the incompressible fluid, a region within the piston for compressible medium and the replenishment of such is provided. To this end, from the shoulder 45 there extends port 46 having its terminus in the shoulder 45 of such dimension that the spring 8 may not be effective fully to close this port. From this larger capacity region of the port as adjacent the shoulder 45, this port 46 upwardly extends to minor capacity upward terminal port 47.

In practice hereunder, the upward thrust of the piston thus reducing the pressure within the skirt of the piston, is effective in the port portion 46 as of considerable capacity, thus creating a quick pull for the minor capacity port region 47, readily clearing such of any incompressible medium accumulation so that the compressible medium may flow into the skirted region of the piston during piston rise. At once on piston compression, the reserve flow through this multiple diameter port 46, 47, under the pressure exerted by the cam 6, tends to maintain the minor capacity port portion 47 clear of clogging action. As the piston depression approaches the surface of the incompressible medium 16, there is trapped upward from the shoulder 45 and in the region of the secondary skirt 44, the residue of this compressible medium which serves as a cushion in minor rocking movements of the arm 5 as to the casing 3.

In practice, in motor vehicle operations with the device hereunder, the location of the shoulder 45 as to the head 7 may be such as to maintain a desired capacity for this minor or secondary skirt region and thus definitely determine the effectiveness of the compressible medium coaction before the hydraulic medium takes hold for the retarding control in the operation of the device hereunder. The operation of arm 5 in depressing the piston head 7 is positive and the cam 6 has not only key assembly position with the shaft 4, but has supplemental set screw 48 as a lost motion take up additional key.

What is claimed and it is desired to secure by Letters Patent is:

1. A hydraulic resistance interposing device comprising a casing for a liquid and providing a cylinder to extend above the normal liquid level in the casing, and a piston in the cylinder having a head and remote from the head a primary portion and adjacent the head a secondary depending skirt portion and a normally open port having communication from above the liquid coacting in piston operation for maintaining a trapped compressible medium in the secondary skirt portion.

2. A hydraulic resistance interposing device comprising a casing for a liquid and providing a cylinder to extend above the normal liquid level in the casing, a piston in the cylinder having a head, a primary skirt portion depending remote from the head, a secondary depending skirt portion toward the head from the primary portion, and a normally open port through the head for maintaining a trapped compressible medium in the secondary skirt portion.

3. A hydraulic resistance interposing device comprising a casing for a liquid and providing a cylinder to extend above the normal liquid level in the casing, a piston in the cylinder having a head, depending skirt means, and a normally open port through the head terminating spaced from the inner side of the head for maintaining a trapped compressible medium within the skirt means in the region of said head.

4. A hydraulic resistance interposing device comprising a casing for a liquid and providing a cylinder to extend above the normal liquid level in the casing, a piston in the cylinder having a head, depending skirt means, and a multiple transverse dimension normally open port through the head into the region of said skirt means for maintaining a trapped compressible medium within the skirt means in the region of said head.

5. A hydraulic resistance interposing device comprising a casing for a liquid and providing a cylinder to extend above the normal liquid level in the casing, a helical spring in the cylinder, and a piston in the cylinder urged upward by said spring, said piston having a depending skirt about the spring and a shoulder within the skirt engaging the spring, and normally open port means for maintaining a trapped compressible medium below the piston.

6. A hydraulic resistance interposing device comprising a casing for a liquid and providing a cylinder to extend above the normal liquid level in the casing, a piston in the cylinder having a head, depending skirt means, and a normally open port through the head having larger capacity terminus below for accelerating clearance of the liquid from the upper port region on piston rise.

7. A hydraulic resistance interposing device comprising a casing for a liquid and providing a cylinder to extend above the normal liquid level in the casing, a helical spring in the cylinder, and a piston in the cylinder urged upward by said spring, said piston having a depending skirt about the spring and a shoulder within the skirt engaging the spring, and normally open port means from the shoulder through the piston head.

8. A hydraulic resistance interposing device comprising a casing for a liquid and providing a cylinder to extend above the normal liquid level in the casing, a helical spring in the cylinder, and a piston in the cylinder urged upward by said spring, said piston having a depending skirt about the spring and a shoulder within the skirt engaging the spring, and port means from the shoulder and upward through the piston head, said port means having a minor capacity terminus and at the shoulder a larger capacity section.

In witness whereof we affix our signatures.

ERNEST W. ACKERMAN.
GRIFFITH C. NICHOLSON.